US009627130B2

(12) United States Patent
Golko et al.

(10) Patent No.: US 9,627,130 B2
(45) Date of Patent: Apr. 18, 2017

(54) MAGNETIC CONNECTION AND ALIGNMENT OF CONNECTIBLE DEVICES

(71) Applicant: Apple Inc., Cupertino, CA (US)

(72) Inventors: Albert J. Golko, Cupertino, CA (US); Eric S. Jol, Cupertino, CA (US); Christopher S. Graham, Cupertino, CA (US); Paul J. Thompson, Cupertino, CA (US); Jeffrey M. Alves, Cupertino, CA (US); Daniel Wagman, Cupertino, CA (US); Stephen E. Yao, Cupertino, CA (US); Makiko K. Brzezinski, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 14/666,556

(22) Filed: Mar. 24, 2015

(65) Prior Publication Data

US 2015/0270046 A1    Sep. 24, 2015

Related U.S. Application Data

(60) Provisional application No. 61/969,343, filed on Mar. 24, 2014.

(51) Int. Cl.
| | | |
|---|---|---|
| H01F 7/02 | (2006.01) | |
| H01F 38/14 | (2006.01) | |
| H02J 7/00 | (2006.01) | |
| H04B 1/3877 | (2015.01) | |
| H02J 50/12 | (2016.01) | |

(52) U.S. Cl.
CPC ........... *H01F 38/14* (2013.01); *H01F 7/0247* (2013.01); *H02J 7/0044* (2013.01); *H02J 50/12* (2016.02); *H04B 1/3877* (2013.01)

(58) Field of Classification Search
CPC ....... H01F 7/0242; H01F 38/14; H01F 7/0247
See application file for complete search history.

(56) References Cited

U.S. PATENT DOCUMENTS

| | | |
|---|---|---|
| 7,477,039 B2 | 1/2009 | Rodarte et al. |
| 7,710,071 B2 | 5/2010 | Rodarte |
| 7,948,208 B2 | 5/2011 | Partovi et al. |
| 7,952,322 B2 | 5/2011 | Partovi et al. |
| 8,169,185 B2 | 5/2012 | Partovi et al. |

(Continued)

FOREIGN PATENT DOCUMENTS

| | | |
|---|---|---|
| EP | 0977297 | 2/2000 |
| WO | WO2009105615 | 8/2009 |
| WO | WO2013035282 | 3/2013 |

OTHER PUBLICATIONS

International Search Report and Written Opinion, PCT/US2015/022195, 12 pages, Jun. 15, 2015.

*Primary Examiner* — Bernard Rojas
(74) *Attorney, Agent, or Firm* — Kilpatrick Townsend & Stockton LLP

(57) ABSTRACT

A first and second electronic device each including a connection surface and a magnetic element. The first and second devices may be in contact along the respective connection surfaces. The magnetic elements may be configured to align the first and second devices by moving either or both of the first and second devices relative to each other to achieve an aligned position. The magnetic element may also be operative to resist disconnection of first and second electronic devices when in the aligned position.

23 Claims, 12 Drawing Sheets

(56) References Cited

U.S. PATENT DOCUMENTS

| | | |
|---|---|---|
| 8,248,025 B2 | 8/2012 | Sip |
| 8,401,469 B2 * | 3/2013 | Chatterjee ........... H01F 1/15333 455/300 |
| 8,497,657 B2 | 7/2013 | Franks et al. |
| 8,629,652 B2 | 1/2014 | Partovi et al. |
| 8,629,654 B2 | 1/2014 | Partovi et al. |
| 8,890,470 B2 | 11/2014 | Partovi |
| 8,896,264 B2 | 11/2014 | Partovi |
| 8,901,881 B2 | 12/2014 | Partovi |
| 8,912,686 B2 | 12/2014 | Stoner et al. |
| 8,947,047 B2 | 2/2015 | Partovi et al. |
| 9,106,083 B2 | 8/2015 | Partovi |
| 9,112,362 B2 | 8/2015 | Partovi |
| 9,112,363 B2 | 8/2015 | Partovi |
| 9,112,364 B2 | 8/2015 | Partovi |
| 9,178,369 B2 | 11/2015 | Partovi |
| 2009/0212637 A1 * | 8/2009 | Baarman ................. H01F 38/14 307/104 |
| 2011/0050164 A1 | 3/2011 | Partovi et al. |
| 2011/0221385 A1 | 9/2011 | Partovi et al. |
| 2012/0164849 A1 | 6/2012 | Lee et al. |
| 2012/0315771 A1 | 12/2012 | Greig et al. |
| 2013/0093388 A1 | 4/2013 | Partovi |
| 2013/0099563 A1 | 4/2013 | Partovi et al. |
| 2013/0249479 A1 | 9/2013 | Partovi |
| 2013/0260677 A1 | 10/2013 | Partovi |
| 2013/0271069 A1 | 10/2013 | Partovi |
| 2013/0285604 A1 | 10/2013 | Partovi |
| 2013/0285605 A1 | 10/2013 | Partovi |
| 2013/0300204 A1 | 11/2013 | Partovi |
| 2013/0316549 A1 | 11/2013 | DiFonzo et al. |
| 2014/0103873 A1 | 4/2014 | Partovi et al. |
| 2014/0132210 A1 | 5/2014 | Partovi |
| 2014/0191568 A1 | 7/2014 | Partovi |
| 2014/0217970 A1 * | 8/2014 | Tabata ................... H01F 38/14 320/108 |
| 2014/0306654 A1 | 10/2014 | Partovi |
| 2015/0130412 A1 | 5/2015 | Partovi |
| 2015/0145475 A1 | 5/2015 | Partovi et al. |
| 2015/0270046 A1 | 9/2015 | Golko et al. |
| 2015/0280483 A1 | 10/2015 | Golko et al. |
| 2015/0349571 A1 | 12/2015 | Wagman et al. |

* cited by examiner

MAGNETIC CONNECTION AND ALIGNMENT OF CONNECTIBLE DEVICES

CROSS-REFERENCE TO RELATED APPLICATION

This application is a nonprovisional patent application of and claims the benefit to U.S. Provisional Patent Application No. 61/969,343, filed Mar. 24, 2014 and titled "Magnetic Connection and Alignment of Connectible Devices," the disclosure of which is hereby incorporated herein by reference in its entirety.

TECHNICAL FIELD

This disclosure relates generally to connectible devices, and more specifically to magnetic connection and alignment of connectible electronic devices.

BACKGROUND

Many electronic devices connect to other electronic devices. For example, electronic devices such as portable digital media players, wearable devices, and/or other kinds of portable computing devices may connect to one or more docks in order to charge, transfer data, connect to one or more accessories, such as external input/output devices, and so on. A connection may mechanically couple the electronic devices and/or may electrically couple the electronic devices for the purposes of power and/or data transmission. Using some traditional coupling techniques, it may be difficult to maintain a mechanical coupling between the electronic devices in a way that does not interfere or further facilitates an electrical coupling between the electronic devices.

SUMMARY

The present disclosure discloses systems and methods for connection and alignment of connectible electronic devices. A first and second connectible electronic device may each include a connection surface and a magnetic element. The two devices may be placed in a contact position and lateral magnetic force between the magnetic elements that exceeds a friction coefficient between the two surfaces may bring the two devices into an aligned position where transverse magnetic force of the magnetic elements may connect the two devices. One or more of the devices may include a variety of features that aid in the lateral magnetic force exceeding the friction coefficient and bringing of the two devices from a contact position to the aligned position.

In some implementations, such a feature may include one or more of the connection surfaces being formed of low friction material(s). In various implementations, the connection surfaces may be correspondingly shaped to reduce the friction coefficient between the two surfaces when the two devices transition between a contact position and the aligned position. In some implementations, the transverse magnetic force between the magnetic elements may increase between a contact position and the aligned position.

In various implementations, one or more of the magnetic elements may have a face surface and an opposite surface that are joined by multiple side surfaces wherein the face surface faces the respective connection surface and a shield element may at least partially cover the opposite surface and the multiple side surfaces. The shield element, which may be formed of a soft magnetic material, ferromagnetic material, and/or any other material that demonstrates the ability to easily become magnetic such as iron cobalt, may direct a magnetic field of the magnetic element in a direction of the connection surface.

In some implementations, the first electronic device may include one or more receiving components that are operable to receive from one or more transmitting components of the second electronic device. In such a case, the connection and alignment of the two devices may be for at least the purpose of aligning the receiving and transmitting components. For example, the transmitting component may be an inductive power transmission component and the receiving component may be an inductive power receiving component.

In some embodiments, a system for magnetic connection and alignment of connectible electronic devices includes a first electronic device and a second electronic device. The first electronic device includes a first connection surface and a first magnetic element positioned adjacent to the first connection surface and the second electronic device includes a second connection surface and a second magnetic element positioned adjacent to the second connection surface. The first and second magnetic elements may generate a magnetic force operative to move the first and second electronic devices with respect to one another from an initial position to an aligned position. The first connection surface may contact the second connection surface in both the initial position and the aligned position.

One embodiment may be an electronic device, including a housing defining a connection surface and a magnetic element positioned adjacent to the first connection surface and within the housing. The magnetic element may be configured to align the housing with an adjacent external surface by moving one of the housing and external surface relative to the other to achieve an aligned position. The magnetic element may be further operative to resist disconnection of the housing from the external surface when the housing and external surface are in the aligned position.

Another embodiment may be a system for magnetic connection and alignment, including a first electronic device having a first housing defining a first connection surface and a first magnetic element positioned adjacent to the first connection surface. The system may also include a second electronic device having a second housing defining a second connection surface and a second magnetic element positioned adjacent to the second connection surface. The first and second magnetic elements may generate a magnetic force operative to move the first and second electronic devices with respect to one another from an initial position to an aligned position. The first connection surface may contact the second connection surface in both the initial position and the aligned position.

Still another embodiment may be a method for magnetic connection and alignment of connectible electronic devices. The method may include magnetically moving a first electronic device, with respect to a second electronic device, from a contact position to an aligned position; and holding the first electronic device and the second electronic device in the aligned position utilizing the magnetic force between the first magnetic element and the second magnetic element.

It is to be understood that both the foregoing general description and the following detailed description are for purposes of example and explanation and do not necessarily limit the present disclosure. The accompanying drawings, which are incorporated in and constitute a part of the specification, illustrate subject matter of the disclosure.

Together, the descriptions and the drawings serve to explain the principles of the disclosure.

DETAILED DESCRIPTION

Figure 1:
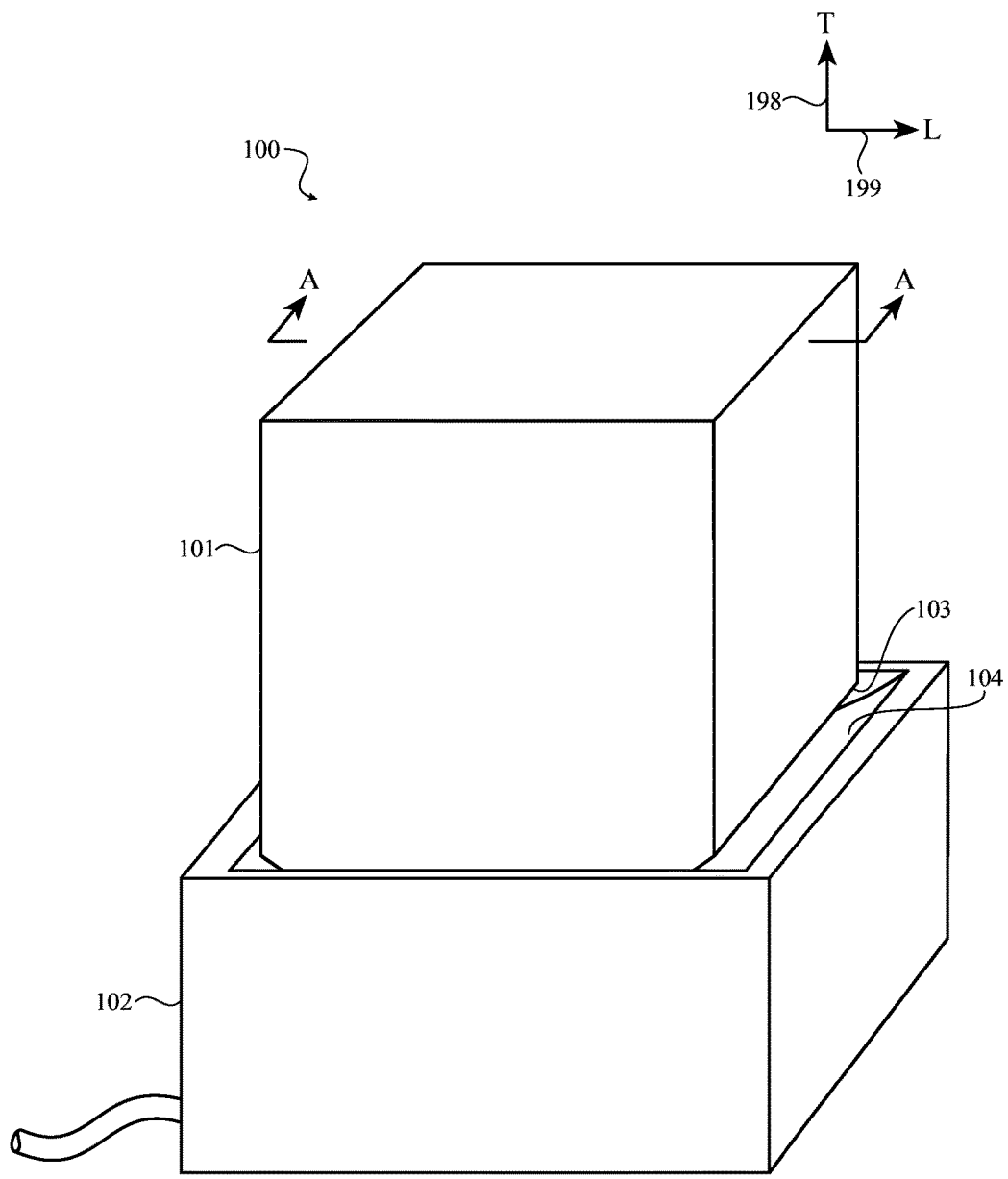
FIG. 1 is a front isometric view illustrating a system for connection and alignment of connectible electronic devices.

The description that follows includes sample systems, methods, and apparatuses that embody various elements of the present disclosure. However, it should be understood that the described disclosure may be practiced in a variety of forms in addition to those described herein.

The present disclosure discloses systems and methods for connection and alignment of connectible electronic devices. A first and a second connectible electronic device may each include a connection surface, which may be part of a housing or other enclosure, and a magnetic element (which may be a permanent magnet). The two devices may be placed in one of a possible number of different initial or contact positions where the connection surfaces contact. A lateral vector of a magnetic force exerted between the magnetic elements may align the two devices with one another so long as the vector force exceeds a friction force between the adjacent surfaces of the two devices. Resulting movement of one or both devices may be both translational and rotational, as the polarities of the magnetic elements potentially rotate one or more of the electronic devices into the aligned position. When the devices are in the aligned position, a transverse vector of a magnetic force generated by the magnetic elements may prevent decoupling of the two devices and/or the adjacent surfaces. The transverse vector may be generally transverse to the lateral vector.

As used herein, a "lateral magnetic force" refers to a magnetic force that moves one or both of the devices laterally with respect to one another. The lateral magnetic force may be a lateral force exerted on the device(s) that, in certain embodiments, is generally aligned with a sliding interface between adjacent surfaces of the two devices. Some transverse (height) motion may occur as a byproduct of an alignment of the two devices with respect to each other, particularly if the adjacent surfaces of the respective devices are curved, stepped, or otherwise non-planar. Nonetheless, motion with a lateral component (even if there is also a transverse motion) may be considered to be generated by a lateral magnetic force. Lateral magnetic force is more fully discussed with respect to FIGS. 1-3 below. As used herein, a "transverse magnetic force" refers to a magnetic force that attracts the devices toward each other in a transverse direction that is generally transverse to the lateral direction. The transverse magnetic force may operate to center and align the two devices as well as resist a separation or increased gap between the two devices. Motion with a transverse component (even if there is also a lateral motion) may be considered to be generated by (or resisted by) a transverse magnetic force. Transverse magnetic force is more fully discussed with respect to FIGS. 1-3 below. As discussed herein, lateral magnetic force and transverse magnetic force may be components of the same, single magnetic field. Both may vary based on the positions of the magnetic elements.

Alignment of the two devices may be useful for a number of reasons and in various implementations. For example, in some implementations the two devices may respectively include transmitting and receiving components of an inductive power transmission system. In such a case, the connection and alignment of the two devices may align the transmitting and receiving components to promote inductive power transmission efficiency.

One or more of the devices may include a variety of features that aid in the lateral magnetic force exceeding a friction coefficient between housings (or portions of housings) of the two devices, thereby bringing of the two devices from an initial or contact position to the aligned position. In some implementations, such a feature may include one or more of the connection surfaces being formed of low friction material(s), such as a crystalline material, a material having a friction-reducing coating or treatment, a polished surface, and so on.

In various implementations, the connection surfaces (and/or other parts of the housing) may be correspondingly shaped to reduce the friction coefficient between the two surfaces when the two devices transition between an initial or contact position and the aligned position. This corresponding shaping may also supplement the lateral magnetic force that brings the connection surfaces into the aligned position, such as by causing gravity to aid in transitioning the two devices. Such corresponding shaping may include correspondingly curving the surfaces, such as where the connection surface of the first electronic device is convexly curved and the connection surface of the second electronic device is correspondingly concavely curved.

In some implementations, the transverse magnetic force between the magnetic elements may increase as the devices move from an initial or contact position to an aligned position. In some cases, the transverse magnetic force may be weak enough in the initial or contact position that the connection surfaces are not suddenly pulled together, this may prevent a user from perceiving a perceptible "snap effect" when placing the connection surfaces in contact.

For example, one or more of the magnetic elements may be moveably mounted so as to be biased away from the respective connection surface when the devices are not in the aligned position. The transverse magnetic force may bring the magnetic elements toward the respective connection surface when the devices transition or move to the aligned position.

In various implementations, one or more of the magnetic elements may have a face surface and an opposite surface that are joined by multiple side surfaces wherein the face surface faces the respective connection surface and a shield element may at least partially cover the opposite surface and the two side surfaces. A gap may be present between the shield element and the multiple side surfaces. The shield element, which may be formed of a soft magnetic material, ferromagnetic material, and/or any other material that demonstrates the ability to easily become magnetic such as iron cobalt, may direct a magnetic field of the magnetic element in a direction of the connection surface. Such direction of the magnetic field may enable use of smaller magnetic elements than would otherwise be possible and may enable transverse magnetic force between the magnetic elements to be stronger when the devices are in the aligned position and weaker when the devices are in a contact or non-aligned position.

In some implementations, the first electronic device may include one or more receiving components that are operable to receive from one or more transmitting components of the second electronic device. In such a case, the connection and alignment of the two devices may be for at least the purpose of aligning the receiving and transmitting components. For example, the transmitting component may be an inductive power transmission component and the receiving component may be an inductive power receiving component. In some cases, the second electronic device may operate as a dock for the first electronic device.

FIG. 1 is a front isometric view illustrating a system 100 for connection and alignment of connectible electronic devices. The system may include a first electronic device 101 and a second electronic device 102. Although FIG. 1 illustrates the first electronic device 101 as a cordless electronic device having a housing of a particular shape and the second electronic device 102 as a dock for the cordless electronic device, it is understood that this is merely an example. In various implementations, either the first electronic device 101 or the second electronic device 102 may be any kind of electronic device such as a laptop computer, a tablet computer, a mobile computing device, a smart phone, a cellular telephone, a digital media player, a dock that connects to another electronic device for the purposes of charging and/or connecting the electronic device to one or more external components, and/or any other such electronic device.

As illustrated, the first electronic device 101 includes a first connection surface 103 that is operable to contact a second connection surface 104 of the second electronic device 102. In some cases, the first connection surface 103 and second connection surface 104 form a sliding interface between the first electronic device 101 and the second electronic device 102. As such, the first and second electronic devices may be positionable with respect to each other in one or more directions.

Figure 2:
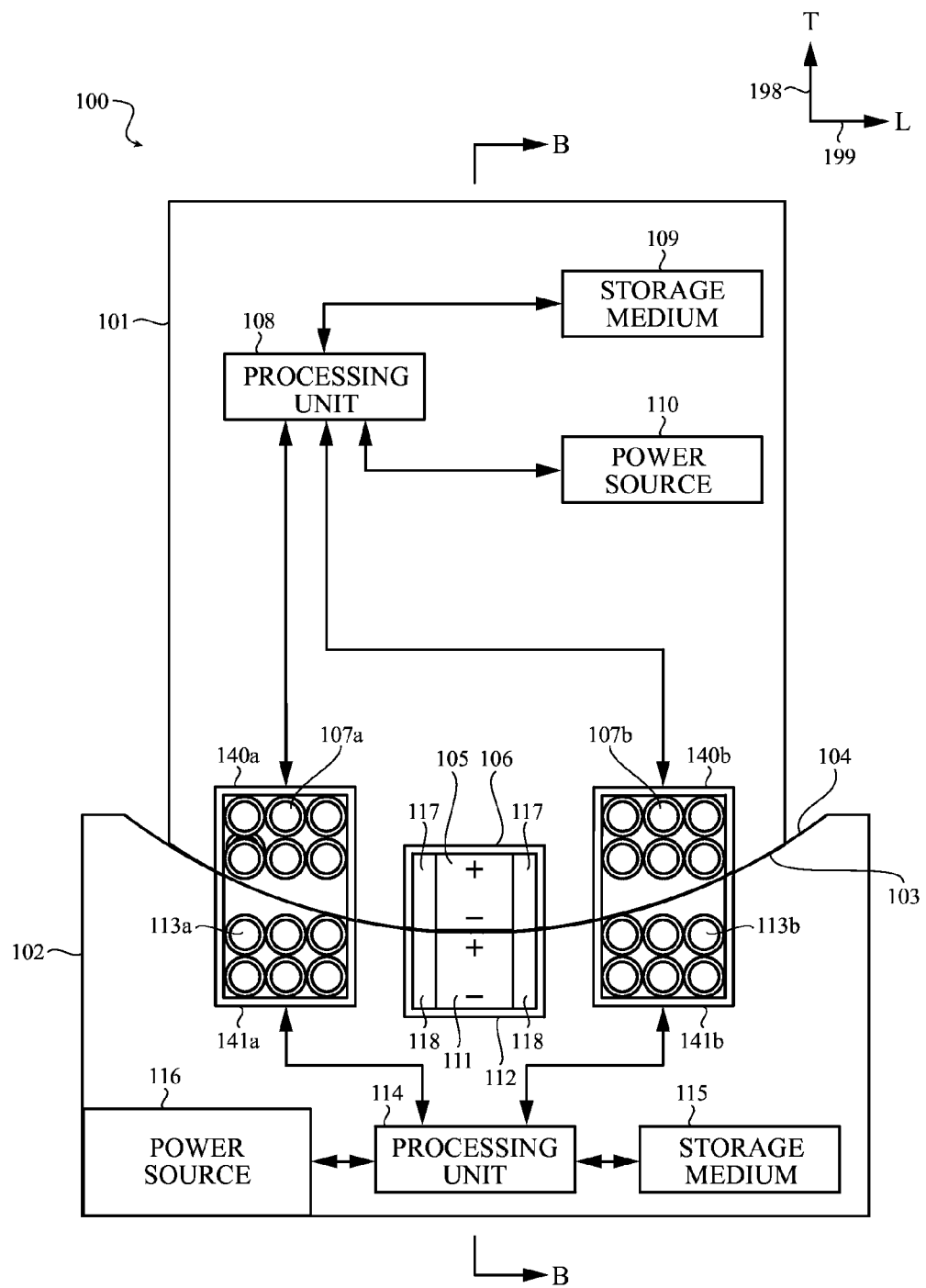
FIG. 2 is a cross-sectional front plan view of the system of FIG. 1, taken along section A-A of FIG. 1, illustrating the connectible electronic devices in an aligned position.
Figure 3:
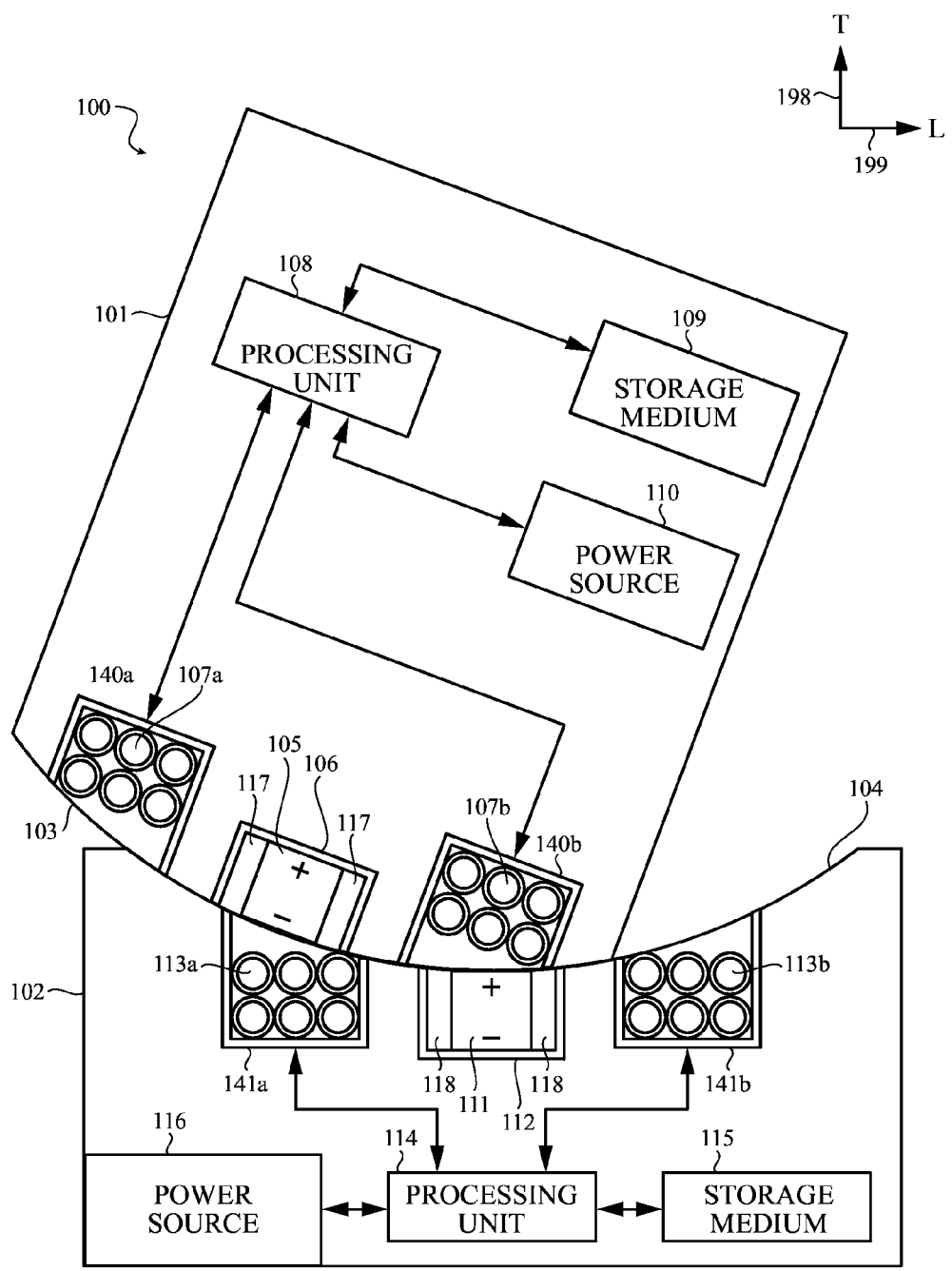
FIG. 3 illustrates the system of FIG. 2 showing the connectible electronic devices in one possible contact position.

FIG. 2 is a cross-sectional front plan view of the system 100 of FIG. 1, taken along section A-A of FIG. 1 illustrating the first and second connectible electronic devices 101 and 102 in an aligned position. FIG. 3 illustrates the system of FIG. 2 showing the first and second connectible electronic devices 101 and 102 in one possible contact position. The first and second connection surfaces 103 and 104 may contact at any number of different points. As such, any number of different contact positions may be possible, of which FIG. 3 is an example. However, the first and second connectible electronic devices 101 and 102 may have a single aligned position, illustrated in FIG. 2, where a first magnetic element 105 connects with a second magnetic element 111 and a transmitting component 113a and 113b (cross-sectional portions of a single coil) is aligned with a receiving component 107a and 107b (cross-sectional portions of a single coil).

As illustrated in FIG. 2, the first electronic device 101 may include one or more first magnetic elements 105 (which may be a permanent magnet and may include a shield element 106), receiving components 107a and 107b (cross-sectional portions of a single coil that respectively include shield elements 140a and 140b), processing units 108, one or more non-transitory storage media 109 (which may take the form of, but is not limited to, a magnetic storage medium; optical storage medium; magneto-optical storage medium; read only memory; random access memory; erasable programmable memory; flash memory; and so on), and/or one or more power sources 110 (such as one or more batteries). The processing unit 108 may execute one or more instructions stored in the non-transitory storage medium 109 to perform one or more first electronic device operations such as one or more receiving operations utilizing the receiving component, communication operations, calculation operations, storage operations, input/output operations, time operations, charging operations, and so on.

Similarly, the second electronic device 102 may include one or more second magnetic elements 111 (which may be a permanent magnet and may include a shield element 112), transmitting components 113a and 113b (cross-sectional portions of a single coil that respectively include shield elements 141a and 141b), processing units 114, one or more non-transitory storage media 115, and/or one or more power sources 116 (such as one or more alternating current or direct current power sources). The processing unit 114 may execute one or more instructions stored in the non-transitory storage medium 115 to perform one or more first electronic device operations such as one or more transmitting operations utilizing the transmitting component, calculation operations, storage operations, and so on.

When the first and second electronic devices 101 and 102 are placed into one of the possible contact positions (such as shown in FIG. 3), the first and second magnetic elements 105 and 111 may generate a magnetic field that exerts lateral and/or transverse magnetic forces, depending on the alignment of the first and second magnetic elements. In some cases, the lateral 199 magnetic force is generally aligned with an interface between the first and second connection surfaces 103 and 104. A lateral 199 magnetic force between the first and second magnetic elements 105 and 111 may bring the electronic devices into the aligned position (shown in FIG. 2) where a transverse 198 magnetic force between the first and second magnetic elements may center or align the two devices as well as resist any transverse disconnect of the two devices. Such movement may be both translational and rotational (but need not be both), as the polarities of the magnetic elements may operate to rotate the first electronic device into the aligned position if the first and second electronic devices are not already rotationally aligned. Although FIGS. 2 and 3 generally illustrate left-right lateral movement, it is understood that this is an example and that the lateral movement may be in any of a variety of directions such that the two devices may be aligned in two dimensions instead of just one as long as the interface between the first and second connection surfaces 103 and 104 permits the movement. One or more of the devices may include one or more of a variety of features that cause the lateral magnetic force to exceed force of friction as expressed by a friction coefficient (such as a static and/or kinetic friction coefficient) between the first and second connection surfaces 103 and 104.

In some implementations, one or more of the first and second connection surfaces 103 and 104 may be formed of a low friction material, such as a crystalline material, a material having a friction-reducing coating or treatment, a polished surface, and so on. By forming one or more of the surfaces from a low friction material, less lateral magnetic force is required to exceed the friction coefficient between the two surfaces and bring the first and second electronic devices 101 and 102 from a contact position to the aligned position. If the lateral magnetic force were not to exceed the friction coefficient, friction between the two surfaces could prevent transition between the two positions and/or make such transition more difficult.

In various implementations, the first and second connection surfaces 103 and 104 may be correspondingly shaped to minimize the friction coefficient between the two surfaces when the first and second electronic devices 101 and 102 are transitioned between a contact position and the aligned position. For example, as shown in FIG. 2, the first connection surface 103 may be convexly curved and the second connection surface 104 may be concavely curved to correspond to the curve of the first connection surface. By curving these portions of the housings in this fashion, gravity may assist in aligning the devices.

That is, the corresponding curves of the first and connection surfaces 103 and 104 may be formed so that gravity causes the first connection surface to move relative to the second connection if the force of friction between the surfaces is sufficiently weak. Thus, gravity may assist the lateral 199 magnetic force in bringing the connection surfaces into the aligned position. The corresponding curves may be coated, machined, polished or otherwise processed to reduce frictional force between the first and second connection surfaces 103 and 104 during movement of the surface(s). As can be seen in FIG. 3, the corresponding curves of the first and second connection surfaces may cause gravity to aid in transitioning the two devices to the aligned position (shown in FIG. 2) as the first electronic device 101 may slide from a higher position on the slope of the second connection surface 104 to the lowest position (i.e., the aligned position).

Figure 4:
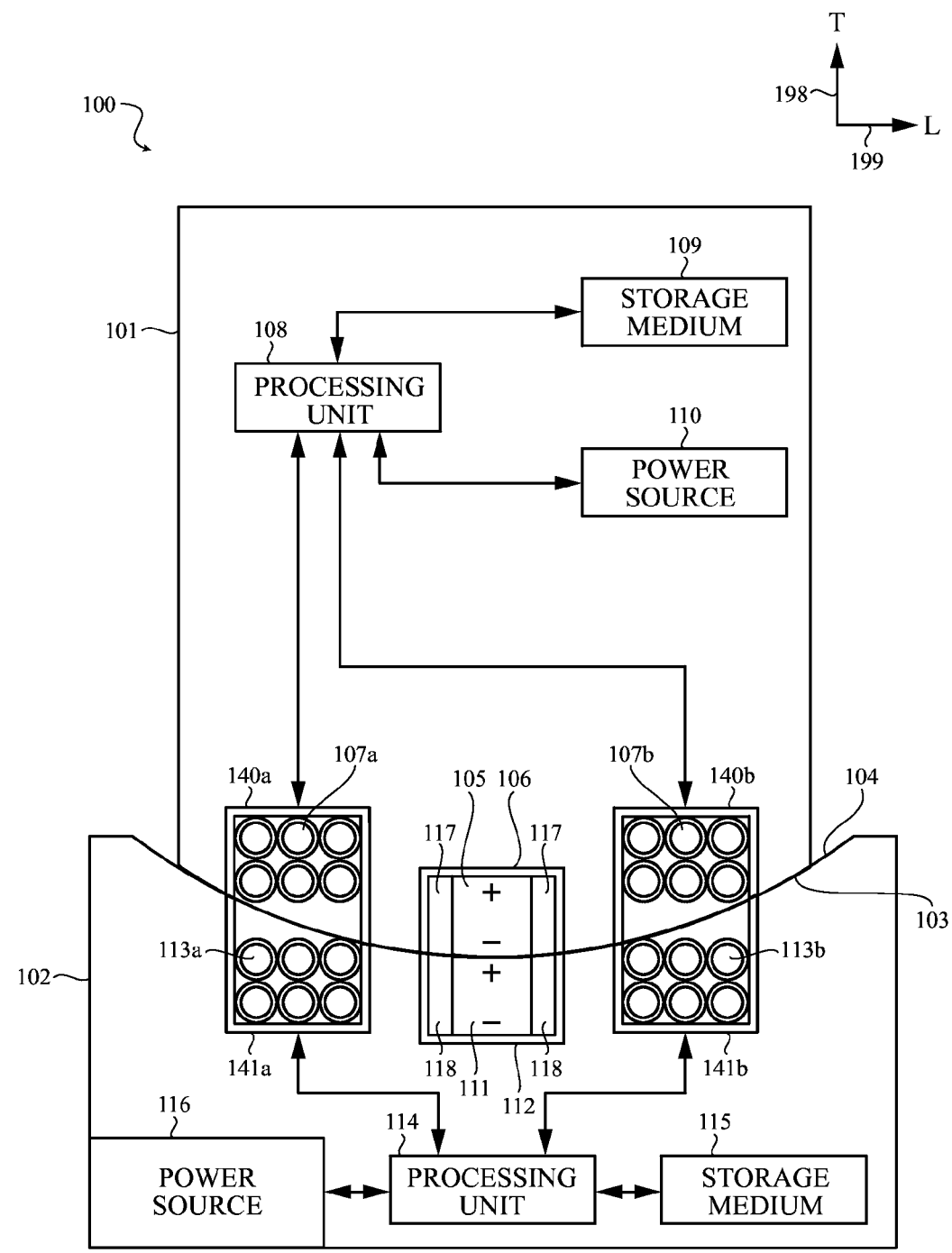
FIG. 4 is a cross-sectional side view of the system of FIG. 2, taken along section B-B of FIG. 2.

FIG. 4 is a cross-sectional side view of the system of FIG. 2, taken along section B-B of FIG. 2 that further illustrates how the concavely curved second connection surface 104 may correspond to the convexly curved first connection surface 103.

Although FIGS. 3 and 4 illustrate a particular example of corresponding curves, it is understood that this is an example and that other corresponding surface configurations are possible and contemplated. For example, in various implementations the second connection surface 104 may be convexly curved and the first connection surface 103 may be concavely curved.

In some implementations, the transverse 198 magnetic force between the first and second magnetic elements 105 and 111 may increase between a contact position and the aligned position. As the transverse magnetic force may be weak enough in a contact position that the first and second connection surfaces 103 and 104 are not suddenly pulled together, this may prevent a user from feeling a "snap effect" that is perceptible when contacting the connection surfaces. Further, as the transverse magnetic force may be weaker in various contact positions and stronger (increasing as compared to one or more of the contact positions) in the aligned position, the magnetic elements may be utilized to connect the first and second devices 101 and 102 in the aligned position without increasing the friction coefficient between the first and second connection surfaces when the first and second devices 101 and 102 transition from a contact position to the aligned position.

Figure 7A:
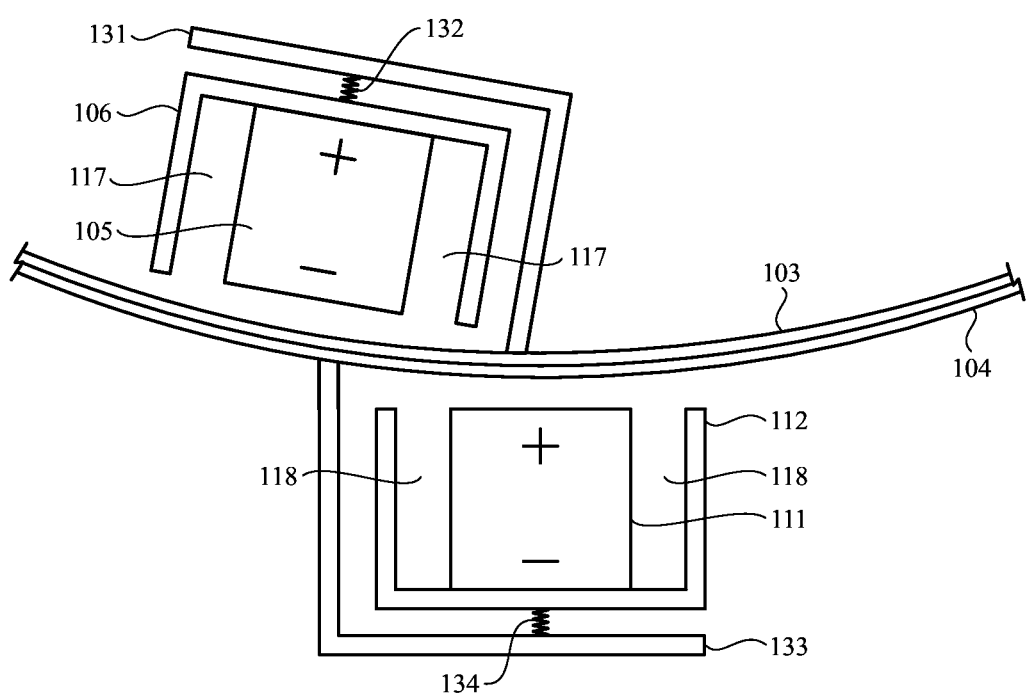
FIG. 7A is a close-up view of the first and second magnetic elements of an alternative embodiment of the first and second electronic devices in a contact position.
Figure 7B:
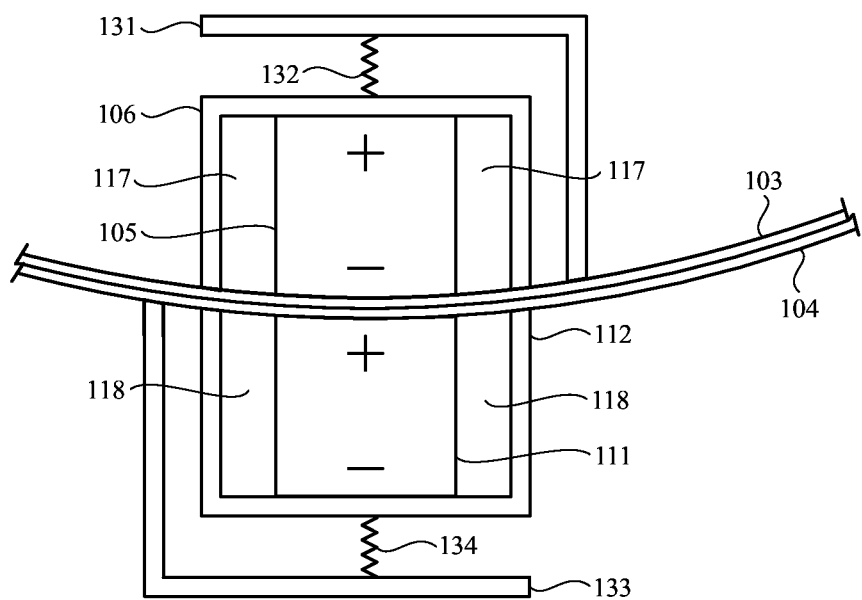
FIG. 7B is a close-up view of the first and second magnetic elements of the alternative embodiment of the first and second electronic devices in the aligned position.

For example, as illustrated in FIG. 7A, one or more of the magnetic elements 105 and 111 may be moveably mounted so as to be biased away from the respective connection surface (such as via springs 132 and/or 134 connected to spring mounts 131 and 133, respectively) when the devices are not in the aligned position. As illustrated in FIG. 7B, the transverse 198 magnetic force may bring the magnetic elements toward the respective connection surface when the devices transition to the aligned position (extending the springs 132 and/or 134).

Further, with reference again to FIG. 2, in various implementations the first and second magnetic elements 105 and 111 may include shield elements 106 and 112, respectively. Each magnetic element may have a face surface and an opposite surface that are joined by multiple side surfaces such that the face surface faces (shown facing) the respective connection surface. The respective shield element may at least partially cover the opposite surface and the two side surfaces. A gap 117 or 118 may be present between (defined by) and offset the respective shield element and the multiple side surfaces.

The shield element 106 or 112, which may be formed of a soft magnetic material, ferromagnetic material, and/or any other material that demonstrates the ability to easily become magnetic such as iron cobalt, may direct a magnetic field of the magnetic element in a direction of the connection surface. Such direction of the magnetic field may enable use of smaller magnetic elements than would otherwise be possible and may enable transverse 198 magnetic force between the magnetic elements to be stronger when the first and second electronic devices 101 and 102 are in the aligned position and weaker when the devices are in a contact position without adversely impacting lateral 199 magnetic force between the magnetic elements.

Figure 5A:
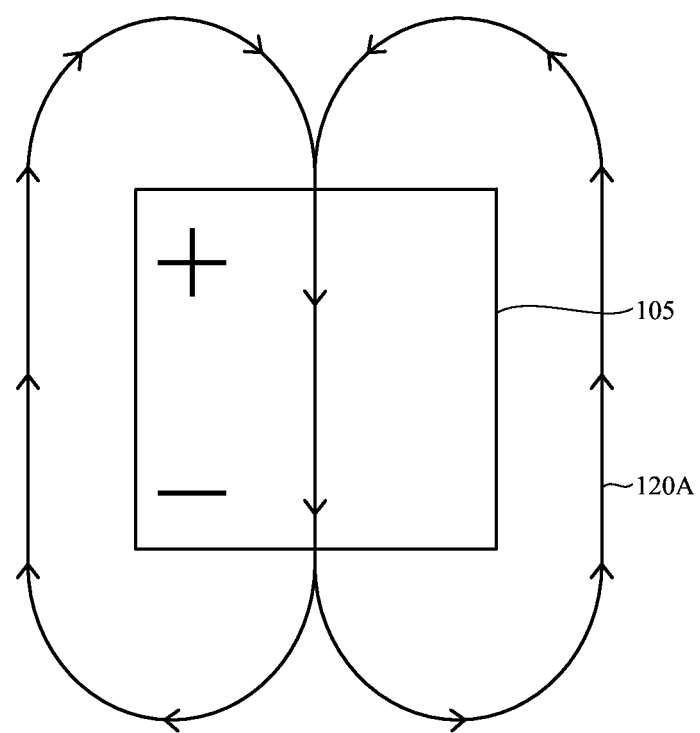
FIG. 5A illustrates a magnetic field of the first magnetic element of FIG. 2, when the first magnetic element is removed from the first electronic device and the shield element.
Figure 5B:
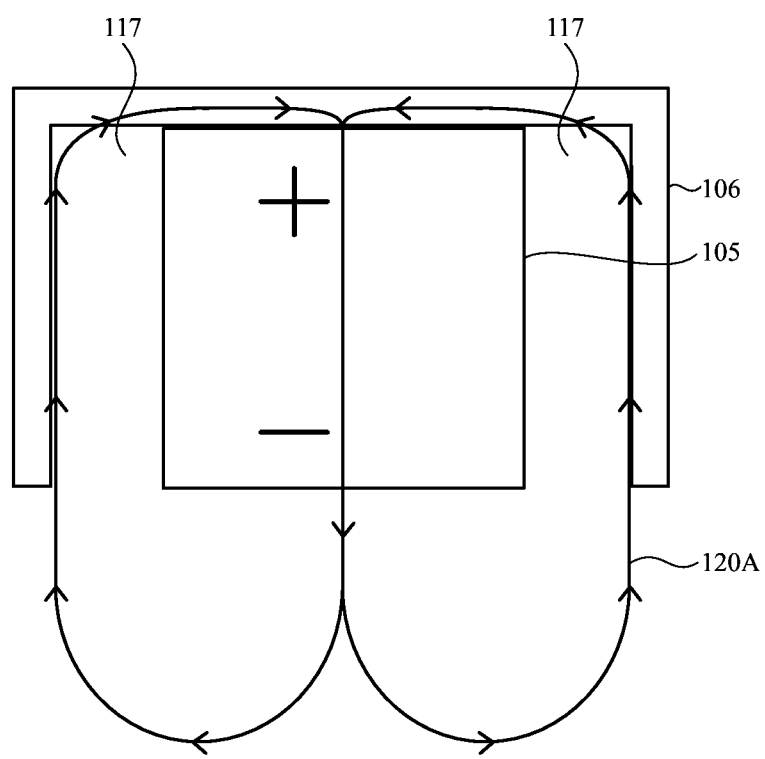
FIG. 5B illustrates the magnetic field of the first magnetic element including the shield element of FIG. 2 removed from the first electronic device.

FIG. 5A illustrates a magnetic field 120A (including a sample field line) of the first magnetic element 105 of FIG. 2 removed from the first electronic device 101 and the shield element 106. By way of contrast, FIG. 5B illustrates the magnetic field 120A of the first magnetic element 105 including the shield element 106 of FIG. 2 removed from the first electronic device 101 (again, including a sample field line). As can be seen by comparing FIGS. 5A and 5B, the inclusion of the shield element 106 may direct the magnetic field 120A toward the first connection surface 103.

Although FIGS. 5A and 5B illustrate the direction of the magnetic field 120A as circulating in one sample direction, it is understood that this is an example. In other embodiments, the magnetic field 120A may be reversed without departing from the scope of the present disclosure.

Returning to FIG. 2, in some implementations the first electronic device 101 may include one or more receiving components 107*a* and 107*b* that are operable to receive from one or more transmitting components 113*a* and 113*b* of the second electronic device 102. In such a case, the connection and alignment of the two devices may be for at least the purpose of aligning the receiving and transmitting components.

For example, the transmitting component 113a and 113b (cross-sectional portions of a single coil that respectively include shield elements 141a and 141b) may be an inductive power transmission component and the receiving component 107a and 107b (cross-sectional portions of a single coil that respectively include shield elements 140a and 140b) may be an inductive power receiving component. As such, the connection and alignment of the first and second electronic devices 101 and 102 may be for at least the purpose of aligning the inductive power receiving component 107a and 107b and the inductive power transmission component 113a and 113b.

Further, although the receiving component 107a and 107b is shown as parallel to a top surface of the first electronic device 101 and the transmitting component 113a and 113b is shown as parallel to a bottom surface of the second electronic device 102 such that they are not flush aligned with the first and second connection surfaces 103 and 104, it is understood that this is an example. In other implementations, the receiving component 107a and 107b may be curved and flush with the first connection surface 103 and/or the transmitting component 113a and 113b may be curved and flush with the second connection surface 104 without departing from the scope of the present disclosure. In such an implementation, the receiving component 107a and 107b and the transmitting component 113a and 113b may be angled with respect to the top surface of the first electronic device 101 and/or the bottom surface of the second electronic device 102.

In some cases, the second electronic device 102 may operate as a dock for the first electronic device 101. For example, as discussed above where the first and second electronic devices 101 and 102 include inductive power transmission components 113a and 113b and receiving components 107a and 107b, the first and second electronic devices 101 and 102 may be participants in an inductive power transmission system where the second electronic device 102 functions as a charging dock for the first electronic device 101 by inductively transmitting power to the first electronic device 101, which the first electronic device 101 stores in the power source 110.

Figure 6:
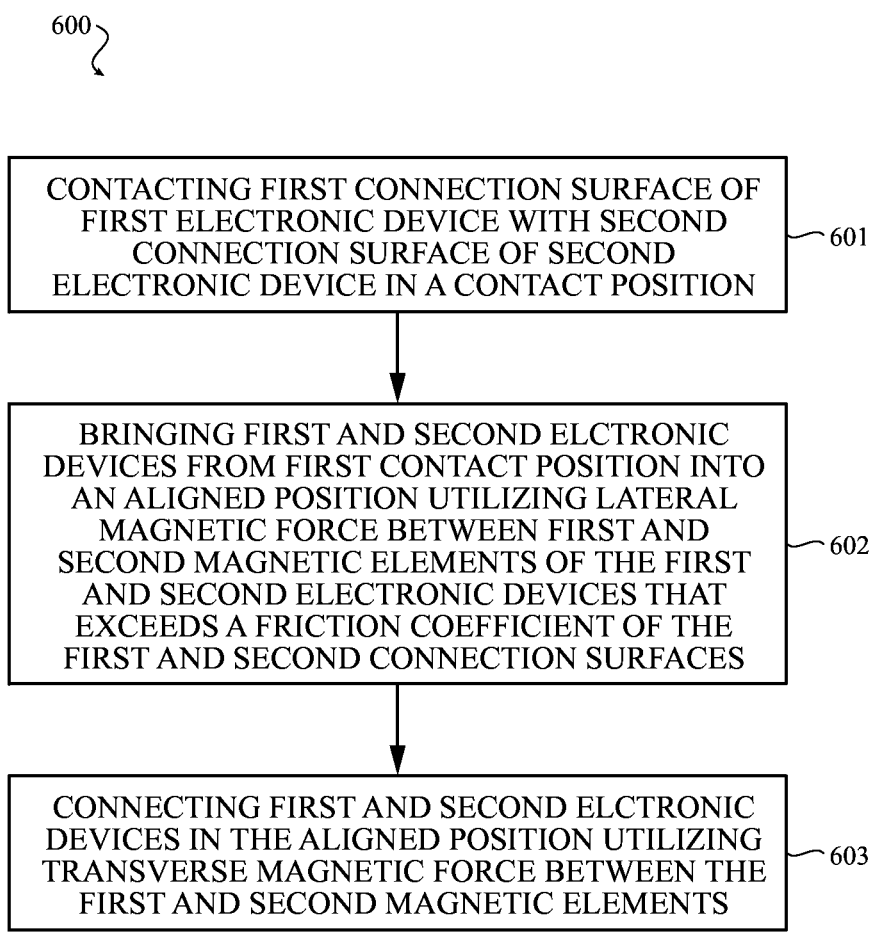
FIG. 6 is a method diagram illustrating a method for connection and alignment of connectible electronic devices. This method may be performed by the system of FIG. 1.

FIG. 6 is a method diagram illustrating a method 600 for connection and alignment of connectible electronic devices. This method may be performed, for example, by the system of FIG. 1.

The flow may begin at block 601 where a first connection surface of a first electronic device is contacted with a second connection surface of a second electronic device in a contact position. The flow may then proceed to block 602.

At block 602, the first and second electronic devices are brought from the contact position into an aligned position utilizing lateral magnetic force between first and second magnetic elements of the first and second electronic devices, respectively. Such movement may be both lateral and rotational, the polarities of the magnetic elements possibly operating to rotate one or more of the electronic devices into the aligned position. The lateral magnetic force may exceed a friction coefficient of the first and second connection surfaces. The flow may then proceed to block 603 where the first and second electronic devices are connected in the aligned position utilizing transverse magnetic force between the first and second magnetic elements.

Although the method 600 is illustrated and described above as including particular operations performed in a particular order, it is understood that this is an example. In various implementations, various configurations of the same, similar, and/or different operations may be performed without departing from the scope of the present disclosure. For example, blocks 602 and 603 are illustrated and described as performed in a linear order. However, in various implementations these operations may be performed in parallel or substantially in parallel.

Figure 8:
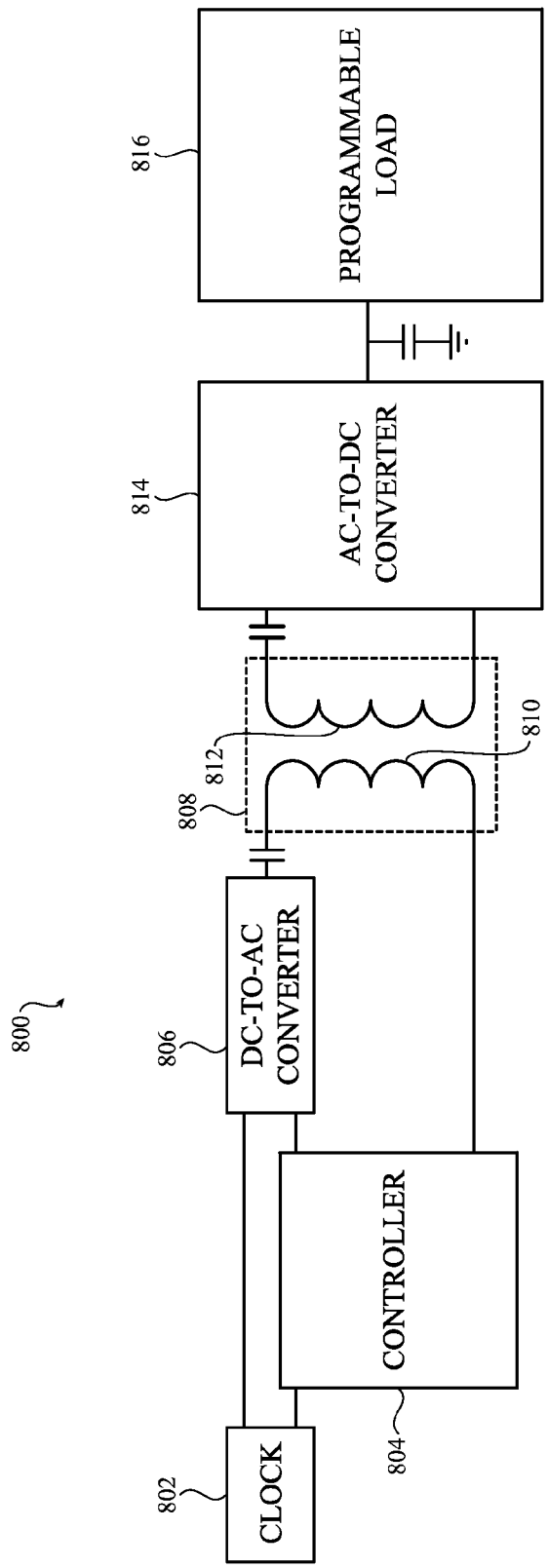
FIG. 8 is a simplified block diagram of an example frequency controlled inductive charging system. The example frequency controlled inductive charging system may be utilized with the system of FIG. 2.

Referring now to FIG. 8, a simplified block diagram of an example frequency controlled inductive charging system 800 is shown that may be utilized with transmitting component 113a and 113b and receiving component 107a and 107b of the system 100 of FIG. 2. The inductive charging system includes a clock circuit 802 operatively connected to a controller 804 and a direct-current converter 806. The clock circuit 802 can generate the timing signals for the inductive charging system 800.

The controller 804 can control the state of the direct-current converter 806. In one embodiment, the clock circuit 802 generates periodic signals that are used by the controller 804 to activate and deactivate switches in the direct-current converter 806 on a per cycle basis. Any suitable direct-current converter 806 can be used in the inductive charging system 800. For example, in one embodiment, an H bridge may be used as a direct-current converter. H bridges are known in the art, so only a brief summary of the operation of an H bridge is described herein.

The controller 804 controls the closing and opening of four switches S1, S2, S3, S4 (not illustrated). When switches S1 and S4 are closed for a given period of time and switches S2 and S3 are open, current may flow from a positive terminal to a negative terminal through a load. Similarly, when switches S2 and S3 are closed for another given period of time while switches S1 and S4 are open, current flows from the negative terminal to the positive terminal. This opening and closing of the switches produces a time-varying current by repeatedly reversing the direction of the current through the load same load.

In an alternate embodiment, an H bridge may not be required. For example, a single switch may control the flow of current from the direct-current converter 806. In this manner, the direct-current converter 806 may function as a square wave generator.

The time-varying signal or square wave signal produced by the direct-current converter 806 may be input into a transformer 808. Typically, a transformer such as those used in the above-referenced tethered charging systems includes a primary coil coupled to a secondary coil, with each coil wrapped about a common core. However, an inductive charging system as described herein includes a primary and a secondary coil separated by an air gap and the respective housings containing each coil. Thus, as illustrated, transformer 808 may not necessarily be a physical element but instead may refer to the relationship and interface between two inductively proximate electromagnetic coils such as a primary coil 810 (which may be the transmitting component 113a and 113b of the system 100 of FIG. 2) and a secondary coil 812 (which may be the receiving component 107a and 107b of the system 100 of FIG. 2).

The foregoing is a simplified description of the transmitter and its interaction with a secondary coil 812 of an inductive power transmission system. The transmitter may be configured to provide a time-varying voltage to the primary coil 810 in order to induce a voltage within the secondary coil 812. Although both alternating currents and square waves were pointed to as examples, one may appreciate that other waveforms are contemplated. In such a case, the controller 804 may control a number of states of the direct-current converter 806. For example, the controller 804 may control the voltage, current, duty cycle, waveform, frequency, or any combination thereof.

The controller 804 may periodically modify various characteristics of the waveforms applied to the primary coil 810 in order to increase the efficiency of the operation of the power transmitting circuitry. For example, in certain cases, the controller 804 may discontinue all power to the primary coil 810 if it is determined that the secondary coil 812 may not be inductively proximate the primary coil 810. This determination may be accomplished in any number of suitable ways. For example, the controller 804 may be configured to detect the inductive load on the primary coil 810. If the inductive load falls below a certain selected threshold, the controller 804 may conclude that the secondary coil 812 may not be inductively proximate the primary coil 810. In such a case, the controller 804 may discontinue all power to the primary coil 810.

In other cases, in one embodiment the controller 804 may set the duty cycle to be at or near a resonance frequency of the transformer 808. In another example, the period of the waveform defining the active state of the duty cycle (i.e., high) may be selected to be at or near the resonance frequency of the transformer 808. One may appreciate that such selections may increase the power transfer efficiency between the primary coil 810 and the secondary coil 812.

In an alternate example, the controller 804 may discontinue all power to the primary coil 810 if a spike in inductive load is sensed. For example, if the inductive load spikes at a particular rate above a certain selected threshold the controller 804 may conclude that an intermediate object may be placed inductively proximate the primary coil 810. In such a case, the controller 804 may discontinue all power to the primary coil 810.

In still further examples, the controller 804 may modify other characteristics of the waveforms applied to the primary coil 810. For example, if the receiver circuitry requires additional power, the controller 804 may increase the duty cycle of the waveform applied to the primary coil 810. In a related example, if the receiver circuitry requires less power, the controller 804 may decrease the duty cycle of the waveform applied to the primary coil 810. In each of these examples, the time average power applied to the primary coil 810 may be modified.

In another example, the controller 804 may be configured to modify the magnitude of the waveform applied to the primary coil 810. In such an example, if the receiver circuitry requires additional power, the controller 804 may amplify the maximum voltage of the waveform applied to the primary coil 810. In the related case, the maximum voltage of the waveform may be reduced if the receiver circuitry requires less power.

With reference to FIG. 8, and as noted above, the transmitter portion of the inductive power transmission system may be configured to provide a time-varying signal to the primary coil 810 in order to induce a voltage within the secondary coil 812 in the receiver through inductive coupling between the primary coil 810 and the secondary coil 812. In this manner, power may be transferred from the primary coil 810 to the secondary coil 812 through the creation of a varying magnetic field by the time-varying signal in the primary coil 810.

The time-varying signal produced in the secondary coil 812 may be received by an direct-current converter 814 that converts the time-varying signal into a DC signal. Any suitable direct-current converter 814 can be used in the inductive charging system 800. For example, in one embodiment, a rectifier may be used as an direct-current converter. The DC signal may then be received by a programmable load 816.

In some embodiments, the receiver direct-current converter 814 may be a half bridge. In such examples, the secondary coil 812 may have an increased number of windings. For example, in some embodiments, the secondary coil may have twice as many windings. In this manner, as one may appreciate, the induced voltage across the secondary coil 812 may be reduced by half, effectively, by the half bridge rectifier. In certain cases, this configuration may require substantially fewer electronic components. For example, a half bridge rectifier may require half as many transistors as a full wave bridge rectifier. As a result of fewer electronic components, resistive losses may be substantially reduced.

In certain other embodiments, the receiver may also include circuitry to tune out magnetizing inductance present within the transmitter. As may be known in the art, magnetizing inductance may result in losses within a transformer formed by imperfectly coupled coils. This magnetizing inductance, among other leakage inductance, may substantially reduce the efficiency of the transmitter. One may further appreciate that because magnetizing inductance may be a function of the coupling between a primary and secondary coil, that it may not necessarily be entirely compensated within the transmitter itself. Accordingly, in certain embodiments discussed herein, tuning circuitry may be included within the receiver. For example, in certain embodiments, a capacitor may be positioned parallel to the programmable load 816.

In still further examples, a combination of the above-referenced sample modifications may be made by the controller. For example, the controller 804 may double the voltage in addition to reducing the duty cycle. In another example, the controller may increase the voltage over time, while decreasing the duty cycle over time. One may appreciate that any number of suitable combinations are contemplated herein.

Other embodiments may include multiple primary coils 810. For example, if two primary coils are present, each may be activated or used independently or simultaneously. In such an embodiment, the individual coils may each be coupled to the controller 804. In further examples, one of the several individual primary coils 810 may be selectively shorted. For example, a switch may be positioned in parallel to the coil such that when the switch is off current may run through the inductor. On the other hand, when the switch is on, no current will run through the coil. The switch may be any suitable type of manual, solid state, or relay based switch. In this manner, the amount of increase in current through each of the several coils may be electively controlled. For example, in a circumstance with a high inductive load, the switch may be turned off to include the coil in the circuit with the primary coil 810.

Figure 9:
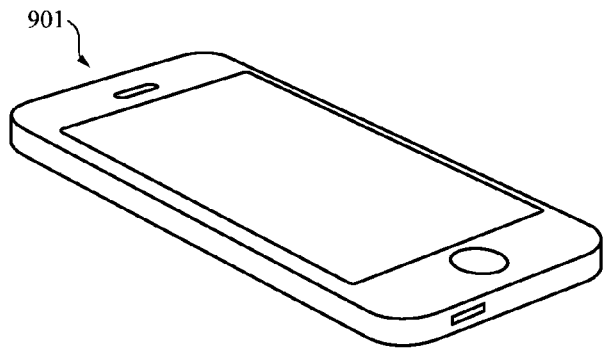
FIGS. 9-11 illustrate isometric views of sample electronic devices in which various embodiments of the magnetic connection and alignment techniques disclosed herein may be utilized.
Figure 10:
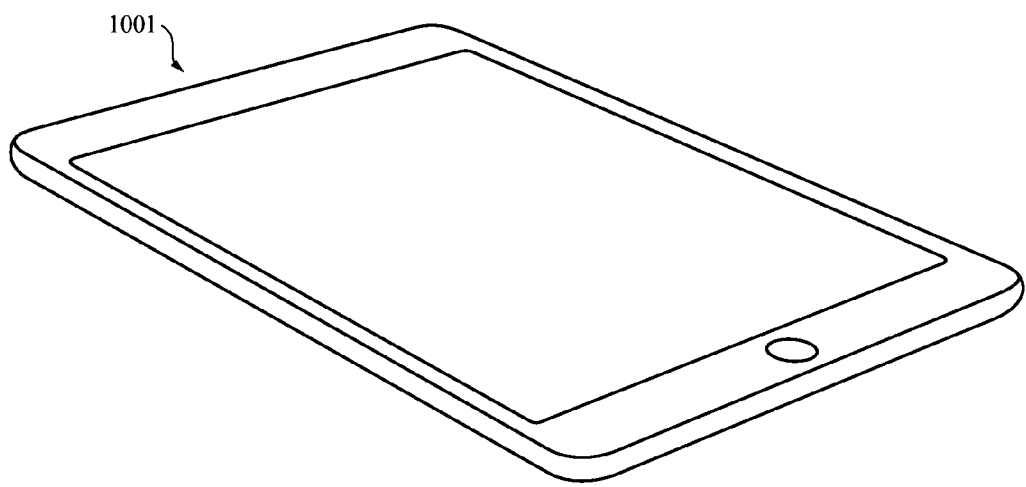
Figure 11:
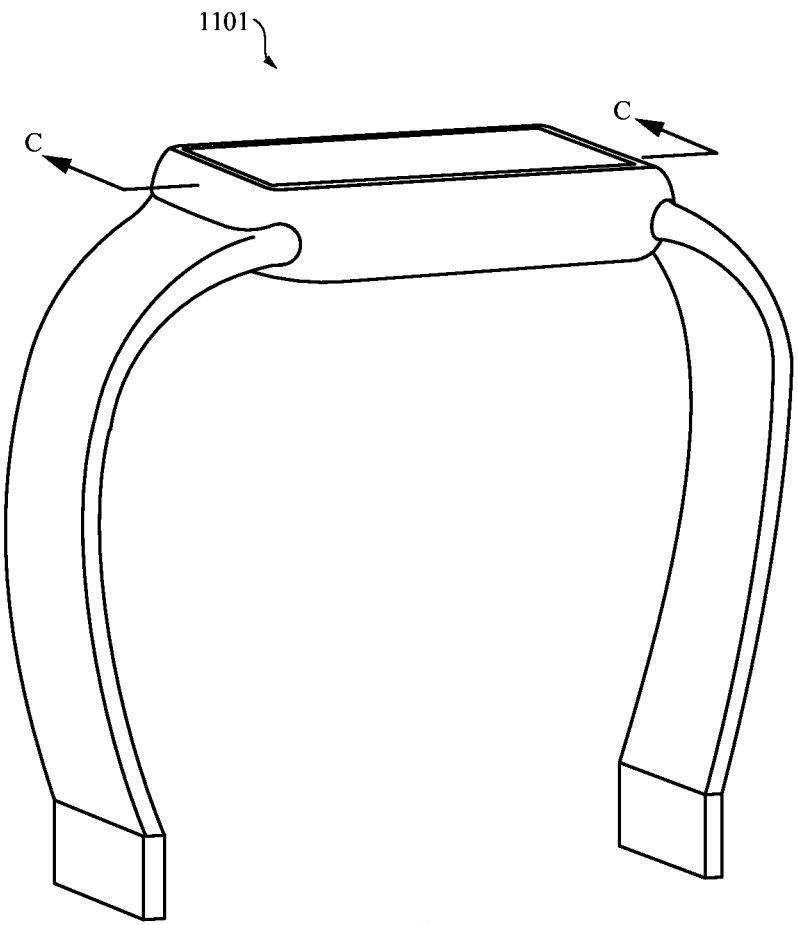

FIGS. 9-11 illustrate isometric views of sample electronic devices 901-1101 in which various embodiments of the magnetic connection and alignment techniques disclosed herein may be utilized. As illustrated, FIG. 9 illustrates a smart phone 901, FIG. 10 illustrates a tablet computer 1001, and FIG. 11 illustrates a wearable device 1101, shown here as a watch. However, it is understood that these are examples and that embodiments of the magnetic connection and alignment techniques disclosed herein may be utilized in a wide variety of different electronic devices without departing from the scope of the present disclosure.

Although FIGS. 1-8 illustrate various configurations of components (such as receiving components 107a and 107b, transmitting components 113a and 113b, and magnetic elements 105 and 111), it is understood that these are examples. Various other configurations are possible in various implementations without departing from the scope of the present disclosure.

Figure 12:
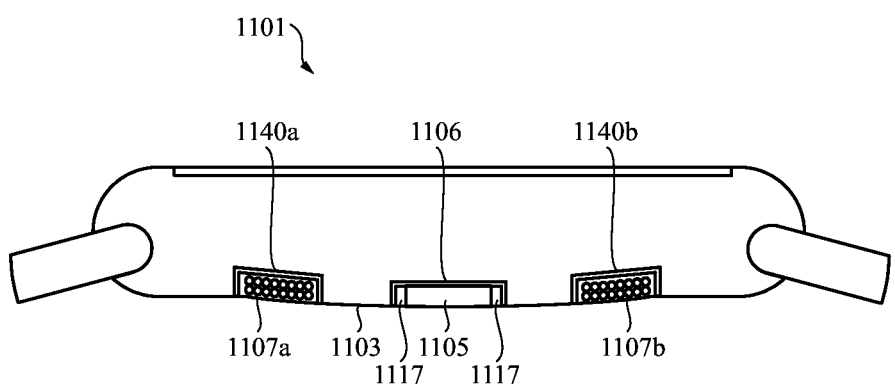
FIG. 12 is a schematic cross-sectional side view of the wearable device of FIG. 11, taken along section C-C of FIG. 11.

For example, FIG. 12 is a schematic cross-sectional side view of the wearable device 1101 of FIG. 11, taken along section C-C of FIG. 11, illustrating another sample configuration of receiving components 1107a and 1107b, first magnetic element 1105, first connection surface 1103, shield elements 1140a and 1140b, and shield element 1106. However, it is understood that this configuration is also an example and that still other configurations are possible without departing from the scope of the present disclosure. Additionally, the wearable device 1101 may contain other components that are omitted in the cross-sectional side view of FIG. 12 for clarity's sake. The wearable device may include within its housing any or all of, or multiples of, an input mechanism, a processor, a memory, a display, an output element such as a motor, a sensor, and so on.

As described above and illustrated in the accompanying figures, the present disclosure discloses systems and methods for connection and alignment of connectible electronic devices. A first and second connectible electronic device may each include a connection surface and a magnetic element. The two devices may be placed in one of a possible number of different contact positions where the connection surfaces contact and lateral magnetic force between the magnetic elements that exceeds a friction coefficient between the two surfaces may bring the two devices into an aligned position. When the devices are in the aligned position, transverse magnetic force of the magnetic elements may connect the two devices. Optionally, inductive charging of one device from the other may occur when the devices are in the aligned position.

In the present disclosure, the methods disclosed may utilize sets of instructions or operations. It is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

We claim:

1. An electronic device, comprising:
   a housing defining a connection surface;
   a receiving component positioned proximate to the connection surface and within the housing, the receiving component comprising a coil of wire and a coil shield, wherein the coil shield is positioned along a surface of the coil of wire opposing the connection surface and along sides of the coil of wire transverse to the connection surface; and
   a magnetic element positioned proximate to the connection surface and within the housing, the magnetic element comprising a magnet and a magnet shield positioned along a surface of the magnet opposing the connection surface, the magnet shield having sides covering sides of the magnet transverse to the connection surface and separated from the sides of the magnet by gaps, wherein the magnet shield is configured to direct a magnetic field of the magnet toward the connection surface.

2. The electronic device of claim 1, wherein the receiving component is operable to receive transmitted power when the housing and external surface are in the aligned position.

3. The electronic device of claim 2, wherein the receiving component comprises an inductive power receiving component.

4. The electronic device of claim 1, wherein:
   the magnetic element generates a magnetic field; and
   the magnetic field exerts a lateral magnetic force to move one of the housing and external surface relative to the other.

5. The electronic device of claim 4, wherein:
   the magnetic field exerts a transverse magnetic force to resist disconnection of the housing from the external surface; and
   the transverse magnetic force is greater in the aligned position than in a contact position.

6. A system for magnetic connection and alignment, comprising:
   a first electronic device, comprising:
      a first housing;
      a receiving component positioned proximate to the connection surface and within the housing, the receiving component comprising a coil of wire and a coil shield, wherein the coil shield is positioned along a surface of the coil of wire opposing the connection surface and along sides of the coil of wire transverse to the connection surface; and
      a first magnetic element, positioned within the first housing, the first magnetic element comprising a magnet and a magnet shield, the magnet having a face surface, an opposite surface, and multiple side surfaces, the magnet shield covering at least a part of the opposite surface and the multiple side surfaces, wherein the magnet shield is separated from the multiple side surfaces by a gap and is configured to direct a magnetic field of the magnet toward the face surface; and
   a second electronic device, comprising:
      a second housing; and
      a second magnetic element positioned within the second housing; wherein:

the first and second magnetic elements generate a magnetic force operative to move the first and second electronic devices with respect to one another from an initial position to an aligned position; and the first housing and second housing contact each other in both the initial position and the aligned position.

7. The system of claim 6, wherein at least one of a first connection surface of the first housing or a second connection surface of the second housing comprises a low friction material.

8. The system of claim 7, wherein the low friction material comprises one or more of a crystalline material, a friction reducing coating, and a polished surface.

9. The system of claim 6, wherein a first connection surface of the first device and a second connection surface of the second device are correspondingly shaped to reduce frictional force between the first and second connection surfaces.

10. The system of claim 6, wherein a transverse magnetic force between the first magnetic element and the second magnetic element increases as the first and second electronic devices move between the initial position and the aligned position.

11. The system of claim 10, wherein:

the first magnetic element is moveably mounted within the first housing and biased away from a first connection surface of the first housing when the first and second electronic devices are not in the aligned position; and the transverse magnetic force draws the first magnetic element toward the first connection surface when the first and second electronic devices move from the initial position to the aligned position.

12. The system of claim 6, wherein the face surface faces a first connection surface of the first housing.

13. The system of claim 12, wherein the shield element directs a magnetic field of the first magnetic element towards the first connection surface.

14. The system of claim 12, wherein the shield element comprises at least one of a soft magnetic material, a ferromagnetic material, and iron cobalt.

15. The system of claim 12, wherein the shield element is offset by a gap from at least one of the multiple side surfaces.

16. The system of claim 6, wherein the second magnetic element comprises:

a face surface facing a second connection surface of the second device and is joined to an opposite surface by multiple side surfaces; and a shield element that at least partially covers the opposite surface and the multiple side surfaces.

17. The system of claim 16, wherein the magnetic force is a lateral magnetic force that is aligned with an interface between the first and second connection surfaces.

18. A method for magnetic connection and alignment of connectible electronic devices, the method comprising:

magnetically moving a first electronic device, with respect to a second electronic device, from a contact position to an aligned position;

directing a magnetic flux from a magnet of a first magnetic element of the first electronic device toward the second electronic device using a magnet shield that is coupled to a first surface of the magnet and is positioned apart from additional surfaces of the magnet that are transverse to the first surface such that a first receiving component in the first electronic device is aligned with a second receiving component in the second electronic device, the first receiving component comprising a coil of wire and a coil shield: and holding the first electronic device and the second electronic device in the aligned position utilizing a magnetic force between the first magnetic element of the first electronic device and a second magnetic element of the second electronic device.

19. The method of claim 18, wherein the magnetic force exceeds a friction between a first connection surface and a second connection surface.

20. The method of claim 18, wherein magnetically moving the first electronic device and the second electronic device from the contact position to the aligned position comprises moving the first electronic device laterally with respect to the second electronic device.

21. The method of claim 18, further comprising, when the first and second devices are in the aligned position, inductively charging the first device using the second device.

22. The method of claim 18, further comprising magnetically resisting decoupling of the first and second electronic devices.

23. The method of claim 18, wherein the first and second electronic devices are components in an inductive power transmission system and moving the second electronic device into the aligned position increases inductive charging efficiency of the inductive power transmission system.

* * * * *